(12) United States Patent
Wang

(10) Patent No.: US 9,054,818 B2
(45) Date of Patent: Jun. 9, 2015

(54) GESTURE BASED POLLING USING AN INTELLIGENT BEVERAGE CONTAINER

(71) Applicant: Anheuser-Busch InBev, New York, NY (US)

(72) Inventor: Winston Wang, San Francisco, CA (US)

(73) Assignee: Anheuser-Busch InBev, New York, NY (US)

(*) Notice: Subject to any disclaimer, the term of this patent is extended or adjusted under 35 U.S.C. 154(b) by 0 days.

(21) Appl. No.: 13/972,684

(22) Filed: Aug. 21, 2013

(65) Prior Publication Data

US 2014/0059581 A1      Feb. 27, 2014

Related U.S. Application Data

(60) Provisional application No. 61/691,609, filed on Aug. 21, 2012, provisional application No. 61/691,617, filed on Aug. 21, 2012, provisional application No. 61/691,618, filed on Aug. 21, 2012, provisional application No. 61/691,622, filed on Aug. 21, 2012, provisional application No. 61/691,627, filed on Aug. 21, 2012, provisional application No. 61/691,630, filed on Aug. 21, 2012.

(51) Int. Cl.
| | |
|---|---|
| *H04H 60/33* | (2008.01) |
| *H04H 20/63* | (2008.01) |
| *B67C 3/00* | (2006.01) |
| *H04L 29/08* | (2006.01) |
| *B67D 7/34* | (2010.01) |
| *B67D 1/00* | (2006.01) |
| *B67D 1/08* | (2006.01) |
| *G07F 7/06* | (2006.01) |
| *G07F 13/02* | (2006.01) |

(52) U.S. Cl.
CPC ............... *H04H 20/63* (2013.01); *B67C 3/007* (2013.01); *H04L 67/22* (2013.01); *H04H 60/33* (2013.01); *B67D 7/348* (2013.01); *B67D 1/0005* (2013.01); *B67D 1/0872* (2013.01); *B67D 1/0888* (2013.01); *B67D 1/0894* (2013.01); *B67D 2001/0811* (2013.01); *B67D 2001/0812* (2013.01); *B67D 2210/00083* (2013.01); *B67D 2210/00089* (2013.01); *B67D 2210/00091* (2013.01); *G07F 7/0609* (2013.01); *G07F 13/025* (2013.01); *G07F 13/02* (2013.01)

(58) Field of Classification Search
CPC ..................... H04N 21/44222; H04H 60/33
See application file for complete search history.

(56) References Cited

U.S. PATENT DOCUMENTS

| 6,297,853 B1 | 10/2001 | Sharir et al. |
| 7,444,659 B2 | 10/2008 | Lemmons |

(Continued)

*Primary Examiner* — Joshua Taylor
(74) *Attorney, Agent, or Firm* — Holland & Hart LLP

(57) ABSTRACT

Systems, devices, and methods are provided for conducting a polling event. A central server computer system determines a polling event is to be conducted and associates one or more inputs from a beverage container with a corresponding selection. The central server computer system transmits a polling prompt message to the beverage containers to display a prompt for a user to select between a first selection and a second selection. An input is received at the beverage container indicative of the selection by the user. The input may be based on a gesture movement of the beverage container. The selection is communicated to the central server computer system which, based on receiving selections from the participating beverage containers, determines the poll results. The poll results are displayed on one or more public displays or communicated, via a network, to a wireless communication device associated with a user of the beverage container.

17 Claims, 8 Drawing Sheets

(56) References Cited

U.S. PATENT DOCUMENTS

| | | |
|---|---|---|
| 8,341,669 B2 | 12/2012 | Lau et al. |
| 8,839,343 B2 | 9/2014 | Wang |
| 2010/0045705 A1* | 2/2010 | Vertegaal et al. ............. 345/661 |
| 2011/0292299 A1 | 12/2011 | Lau et al. |
| 2012/0158531 A1* | 6/2012 | Dion et al. .................. 705/26.1 |
| 2014/0053944 A1 | 2/2014 | Wang |
| 2014/0059133 A1 | 2/2014 | Wang |

* cited by examiner

GESTURE BASED POLLING USING AN INTELLIGENT BEVERAGE CONTAINER

CROSS-REFERENCE TO RELATED APPLICATION(S)

The present application claims the benefit of and priority to U.S. Provisional Patent Application Ser. No. 61/691,609, entitled "BEVERAGE CONTAINER WITH INTEGRATED ELECTRONIC DISPLAY," filed Aug. 21, 2012; to U.S. Provisional Patent Application Ser. No. 61/691,617, entitled "BEVERAGE CONTAINER WITH DYNAMIC LABEL," filed Aug. 21, 2012; to U.S. Provisional Patent Application Ser. No. 61/691,618, entitled "STATE-BASED CONTAINER MANAGEMENT," filed Aug. 21, 2012; to U.S. Provisional Patent Application Ser. No. 61/691,622, entitled "SOCIAL ACTIVITIES USING INTELLIGENT BEVERAGE CONTAINERS," filed Aug. 21, 2012; to U.S. Provisional Patent Application Ser. No. 61/691,627, entitled "CENTRALLY COORDINATED SOCIAL ACTIVITIES USING INTELLIGENT BEVERAGE CONTAINERS," filed Aug. 21, 2012; and to U.S. Provisional Patent Application Ser. No. 61/691,630, entitled "ACCOUNT-BASED MANAGEMENT OF INTELLIGENT BEVERAGE CONTAINERS," filed Aug. 21, 2012; of which the entirety of each application is incorporated herein by reference.

BACKGROUND

The present invention relates to gesture based polling methods and system that use an intelligent beverage container.

Beverage containers are ubiquitous. While some beverage containers (e.g., aluminum cans) are designed to be used once and then recycled, other types of beverage containers (e.g., glasses, chalices, bottles, etc.) may be refilled and reused many times. Nevertheless, the labels on most refillable beverage containers contain images or text permanently printed on a paper or plastic medium or permanent markings on the material of the beverage container itself. Thus, even though a beverage container may be refilled with multiple different beverages, no solution exists for dynamically updating the label of the beverage container.

SUMMARY

According to a first set of illustrative examples, a method is provided. The method may include: associating each of one or more inputs from a beverage container with a corresponding selection; displaying a prompt on the beverage container for a user of the beverage container to select between a first selection and a second selection; receiving an input at the beverage container indicative of one of the selections by the user; and communicating the one of the selections, based on the input received at the beverage container, to a server. The one or more inputs from the beverage container may include one or more gesture movements of the beverage container. Detecting the input may include detecting whether the beverage container has been moved according to the one or more gesture movements.

In some examples, the method may also include: displaying a request for selection on the beverage container, wherein the displayed request includes information indicative of which input is associated with each of the selections. The input may include one or more of a tilting of the beverage container in a predetermined direction, a raising of the beverage container, a lowering of the beverage container, a striking of the beverage container against an object for one or more times, a rotating of the beverage container, a rotating of at least a portion of the beverage container, or a depressing of a lever of the beverage container. Results of a poll based on the communicated selections from a plurality of beverage containers may be displayed. The results may be displayed on the beverage container.

In some examples, the method may also include: associating a user account with the beverage container; and associating the one of the selections with the user account based on the received input from the beverage container. The method may also include: retrieving a contact information from the user account; and displaying, on a mobile communications device associated with the contact information, results of a poll based on the communicated selections from a plurality of beverage containers.

In some examples, detecting an input from the beverage container may include detecting a signal from one or more of an accelerometer, a gyroscope, or a global positioning system incorporated into the beverage container. Communicating the one of the selections may include transmitting a wireless signal from a wireless communications module in the beverage container.

In a second set of illustrative examples, an apparatus for conducting a polling event is provided. The apparatus may include: a processor; a memory in electronic communication with the processor; and instructions being executable by the processor to, associate each of one or more inputs from a beverage container with a corresponding selection; display a prompt on the beverage container for a user of the beverage container to select between a first selection and a second selection; receive an input at the beverage container indicative of one of the selections by the user; and communicate the one of the selections, based on the input received at the beverage container, to a server. The one or more inputs from the beverage container may include one or more gesture movements of the beverage container. Detecting the input may include detecting whether the beverage container has been moved according to the one or more gesture movements.

In some examples, the instructions may be further executable to display a request for selection on the beverage container, wherein the displayed request includes information indicative of which input is associated with each of the selections.

In a third set of illustrative examples, a central server computer system configured for conducting a polling event is provided. The system may include: a polling module configured to associate each of one or more inputs from a beverage container with a corresponding selection, communicate a polling prompt message to the beverage container to cause the beverage container to display a prompt for a user to select between a first selection and a second selection, receive a selection from the beverage container based on input from the user, and determine results of the polling event based at least in part on the selection received from the beverage container; and a display module configured to display the results of the polling event. The results of the polling event may be displayed on one or more public displays. The results of the polling event may be communicated to a wireless communications device associated with the user of the beverage container to be displayed on the wireless communications device.

In some examples, the one or more inputs from the beverage container may include one or more gesture movements of the beverage container. The beverage container may include one or more of a bottle, a cup, a mug, a glass, a can, a pitcher, a tumbler, or a chalice.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
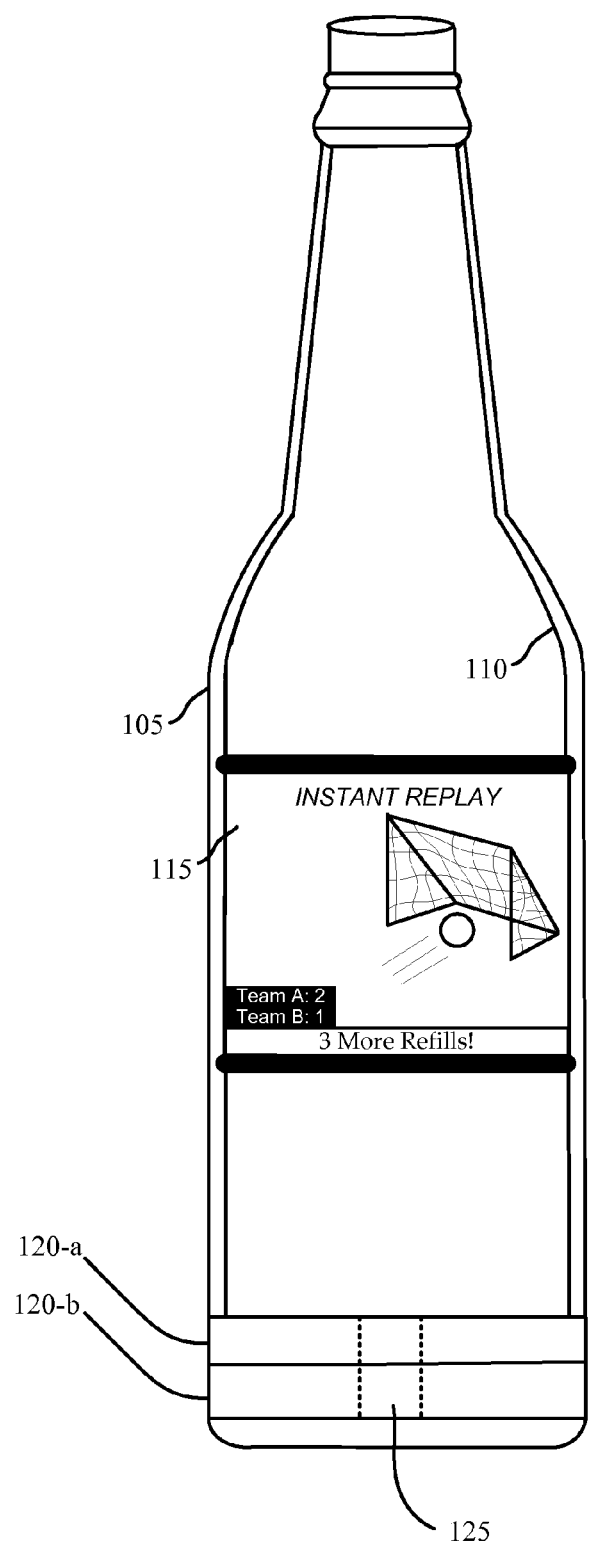
FIG. 1 is a diagram of an example beverage container with an integrated display according to various embodiments of the invention.

Methods, systems, and devices are disclosed for gesture based polling that utilize an intelligent beverage container. In one set of examples, communication may be established between a central server computer system and a plurality of intelligent beverage containers. The beverage containers may each be in wireless communication with the central server computer system to exchange data, identification, or other information. The beverage containers may include an electronic display that can be dynamically changed. Each of the beverage containers may be associated with a user account. The central server computer system may detect the beverage containers and access data from the user accounts associated with the detected beverage containers. The central server may determine a polling event is to be conducted among the users of the beverage containers. The determination may be based on activities occurring at an event, activities occurring separate from an event, on data retrieved from one or more of the user accounts, and/or randomly selected from a variety of topics. The integrated electronic displays on the beverage containers can be updated dynamically during the course of the event to request the users participate in the poll.

According to certain examples, the intelligent beverage containers may include one or more inputs whereby the user of the beverage container may participate in the poll by selecting an input. Exemplary inputs may include, but are not limited to, the integrated electronic display may be a touch screen such that a user can provide an input to the poll by touching at least a portion of the screen, one or more portions of the beverage container can be rotated or otherwise twisted to input a voting selection, and/or a lever or switch integrated into an outside of the beverage container. According to certain embodiments, the input may be received by way of an integrated position/orientation sensing device (e.g., accelerometer, gyroscope, etc.) on the beverage container. The sensing device can determine when the user gestures with the beverage container. For example, the sensing device may detect and provide an output signal indicative of the user raising the beverage container, setting the beverage container down, tilting the beverage container a particular direction, striking the beverage container against an object, moving the beverage container to a new location, taking a drink from the beverage container, and the like.

The central server computer system may generate a message to be sent to at least a portion of the beverage containers such that information related to the polling event may be displayed on the beverage containers. The displayed information may, in addition, instruct the user how to vote a certain way based on the input selected. That is, the user can select a first input (e.g., raising the beverage container) to vote yes and to select a second input (e.g., set the beverage container down) to vote no. The beverage container may communicate the selected input to the central server computer system. The central server computer system may receive the inputs from the beverage containers, count the votes based on the received inputs, and determine the poll results.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

As used herein, the terms "hot-swappable" generally refers to the characteristics of an electronics module as defined by the ability to quickly remove and replace the electronics module with little or no down time. By way of example only, an electronics module that is hot swappable may be inserted, added, removed, and the like, without requiring disrupting a power source and/or an associated module.

Systems, devices, methods, and software are described for gesture based polling using a central server computer system in communication with a plurality of beverage containers.

FIG. 1 illustrates an example intelligent beverage container 100. In the example of FIG. 1, the beverage container 100 is a bottle. However, it should be understood that the principles of the present disclosure may also be applied to other types of beverage containers, including but not limited to glasses, cups, cans, mugs, pitchers, tumblers, chalices, and the like.

The intelligent beverage container 100 may include an outer surface 105 and an inner surface 110. The outer surface 105 may generally define the shape of the beverage container 100, and the inner surface 110 may define the area that holds the beverage. An electronic display 115 may be disposed between the outer surface 105 and the inner surface 110. Alternatively, the electronic display 115 may be disposed on the outer surface 105 of the beverage container 100. Generally, the electronic display 115 may sized and shaped so as to conform to at least a portion of the beverage container 100. The electronic display 115 may be shaped such that the display area of the electronic display 115 conforms to a curvature of the beverage container 100. When the electronic display 115 is disposed between the inner surface 110 and the outer surface 105, at least a portion of the outer surface 105 of the beverage container 100 may be transparent or translucent such that the electronic display 115 is visible from the outside of the beverage container 100.

In certain examples, the curved electronic display 115 may be a thin organic light-emitting diode (OLED) display formed on a flexible polymer or other substrate such that the display area of the electronic display 115 may be flexed according to the curvature of the circumference of the beverage container 100. However, it should be understood that the principles of the present disclosure may also be applied to other types of flexible electronic displays, including, but not limited to active matrix light-emitting diode (AMOLED), passive-matrix OLED, and the like. In certain examples, the curved electronic display 115 may be a 360 degree display such that the display area of the curved electronic display 115 forms a substantially continuous display area around the circumference of the beverage container 100.

Alternatively, or in addition to the electronic display 115, the beverage container 100 may also comprise one or more light sources (e.g., light-emitting diodes (LEDs)) positioned around the circumference and/or length of the beverage container 100. The light sources may be disposed between the inner surface 110 and the outer surface 105 of the beverage container. Each or some of the light sources may emit light at one or more colors.

In certain examples, the beverage container 100 may be a double-walled container in which a first wall forms the inner surface 110, a second wall forms the outer surface 105, and the curved electronic display 115 is disposed intermediate the first and second walls. The first and second walls may be made of the same or different materials. For example, in one embodiment the first and second walls may be made out of glass. In another example, the first wall may be made out of glass and the and second wall may be made out of plastic.

The beverage container 100 may further include one or more electronics modules 120 configured to house control circuitry for the beverage container 100. For example, at least one electronics module 120 may include control circuitry for the curved electronic display 115. Additionally, at least one electronics module 120 may include one or more processors, memory, accelerometers, gyroscopes, wireless devices (e.g., Wireless Local Area Network (WLAN), Radio Frequency Identification (RFID), Near Field Communications (NFC), Global Positioning System (GPS)), or other input/output devices that may suit a particular application of the principles of the present disclosure. Using these electronic components in the electronics module(s) 120 coupled with the curved electronic display 115, a user of the beverage container 100 may interact with a computer network to enhance and augment the experience of actively participating in a poll.

In certain examples, one or more electronics module 120 of the beverage container 100 may be selectively removable and replaceable. For example, an electronics module 120 may house a battery or other power supply that may be selectively replaced to ensure substantially continuous up time for the curved electronic display 115. Additionally or alternatively, an electronics module 120 may house electronic memory that may be selectively replaced when the electronic memory is filled with data. In certain examples one or more of the electronics module 120 may be hot-swappable such that the curved electronic display 115 or other electronic components of the beverage container 100 remain on for all or substantially all of the time during the replacement of the module(s) 120.

In certain examples, the beverage container 100 may include a refill conduit 125 configured to interface with a refill station and refill the beverage container 100. In certain examples, electronics module 120 may be shaped such that the refill conduit 125 passes through the electronics module 120.

While the beverage container 100 shown in FIG. 1 may contain a number of integrated electronics module(s) 120, it will be understood that in certain examples at least some of the electronic functionality of the beverage container 100 shown in FIG. 1 may be implemented in a separate device. For example, one or more of the electronics module 120 may be implemented in a mobile phone or other device that wirelessly communicates with the beverage container 100 to control the curved electronic display 115 or another aspect of the beverage container 100. Additionally or alternatively, a special-purpose device may be provided separately from the beverage container such that the special-purpose device contains one or more of the electronics module 120 and communicates with the beverage container 100 to control the curved electronic display 115 or another aspect of the beverage container 100.

The present disclosure describes various embodiments of beverage containers 100 configured to perform a number of different functions. However, in light of the foregoing description, it will be understood that a functionality described herein as being performed by the beverage container 100 may, in other embodiments, be performed by a device or module external to the beverage container 100. Such a device or module may communicate with the beverage container 100 to achieve the same or a similar effect as the beverage container 100 performing that functionality.

In certain examples, the integrated curved electronic display and other electronic components of the beverage container 100 may enable a user of the beverage container 100 to participate in live polling event managed by a central server computer system. For example, a central server computer system may communicate with the number of beverage containers 100 to implement a variety of live polling event activities. The central server computer system may receive input from the beverage containers 100, from a user account associated with the beverage container, etc., and control the beverage containers 100 to display certain images or text in response and during the course of the live polling event.

According to certain embodiments, a central server computer system may determine which beverage containers 100 are to participate in a polling event based on detecting the beverage containers 100 at a particular location. The central server computer system may detect the beverage containers 100 in a variety of ways. In some examples, the beverage containers 100 may comprise a GPS and a wireless device in the electronics module 120. The beverage containers 100 may communicate location data via the wireless device to the central server computer system such that the beverage containers 100 are detected. According to some examples, the central server computer system may comprise a wireless network that covers a finite area. As beverage containers 100 arrive and connect to the wireless network, the central server computer system detects the beverage containers 100 based on the connection being established. According to even further examples, the beverage containers 100 may comprise a RFID module and a wireless receiver module in the electronics module 120. As a user of the beverage container enters a location, an RFID reader positioned near the entrance (e.g., at a turnstile, gate, door, etc.) reads the RFID from the beverage containers 100 and registers the beverage container 100 with the central server computer system. Subsequently, the central server computer system communicates with one or more messages to the beverage containers 100 to cause the information being displayed on the electronic display 115 to change and to receive an input from the beverage container 100 during a polling event.

Once detected, the central server computer system may transmit messages to the beverage containers 100 to update or change the information being displayed on the electronic display 115. The central server computer system may change the information displayed on the electronic displays 115 of the beverage containers 100 in real time, i.e., to implement a polling event amongst a plurality of detected beverage containers 100 or as other activities occur during an event. For example, the central server computer system may, at a sporting event, transmit one or more messages to each of the beverage containers 100 to cause the electronic display 115 to show information such as the score, the period/quarter/time, possession, fouls, penalties, etc. As shown in FIG. 1, the central server computer system may additionally, or alternatively, cause the electronic displays 115 to display when a team scores. As another example, the central server computer system may, at a concert event, transmit one or more messages to each of the beverage containers 100 to cause the electronic display 115 to show information related to a song (e.g., title, year released, the song lyrics, etc.), information related to the band or band members, upcoming concert dates, etc. In some examples, the central server computer system may cause the electronic displays 115 to display a solid color where the color can be changed based on event activities.

According to certain embodiments related to a polling event, the central server computer system may associate each of one or more inputs from a beverage container 100 with a corresponding selection. For example, in a two choice (yes/no) polling situation, the central server computer system may associate a first input (e.g., toasting a friend) with a yes selection and a second input (e.g., setting the bottle down) with a no selection. In a three choice polling situation (e.g., a poll to determine who the MVP of a game is), the central server computer system may associate a first input (e.g., raising the bottle) with a selection for a first player, a second input (e.g., banging the bottle on an object a number of times) with a selection for a second player, and a third input (e.g., twisting a portion of the bottle) with a selection for a third player.

The central server computer system may then transmit a message to the beverage containers 100 to display a prompt on the electronic displays 115 of the beverage containers 100. The prompt may instruct a user of the beverage container 100 to select between a first selection and a second selection. The prompt may be a text prompt or a graphics prompt. The user of the beverage containers 100 may select between the first and second selections by performing the corresponding input indicated by the prompt (e.g., toast a friend to vote yes). Accordingly, the beverage container 100 may receive the input indicative of the selection by the user. As discussed above, one or more sensors integrated into the beverage containers 100 may determine which input the user has performed. The electronics module 120 of the beverage container 100 may communicate the selection to the central server computer system. As can be appreciated, the central server computer system may receive selections from some, most, all, or some predetermined number of beverage containers 10 participating in the polling event and compute the results of the poll based on the selections. The central server computer system may display the poll results on a public display (e.g., jumbotron display), communicate the poll results to the beverage containers 100 to be shown on the electronic displays 115, and/or communicate the polling results to mobile device of the users of the beverage containers 100 (based on information in the user's user account).

Figure 2:
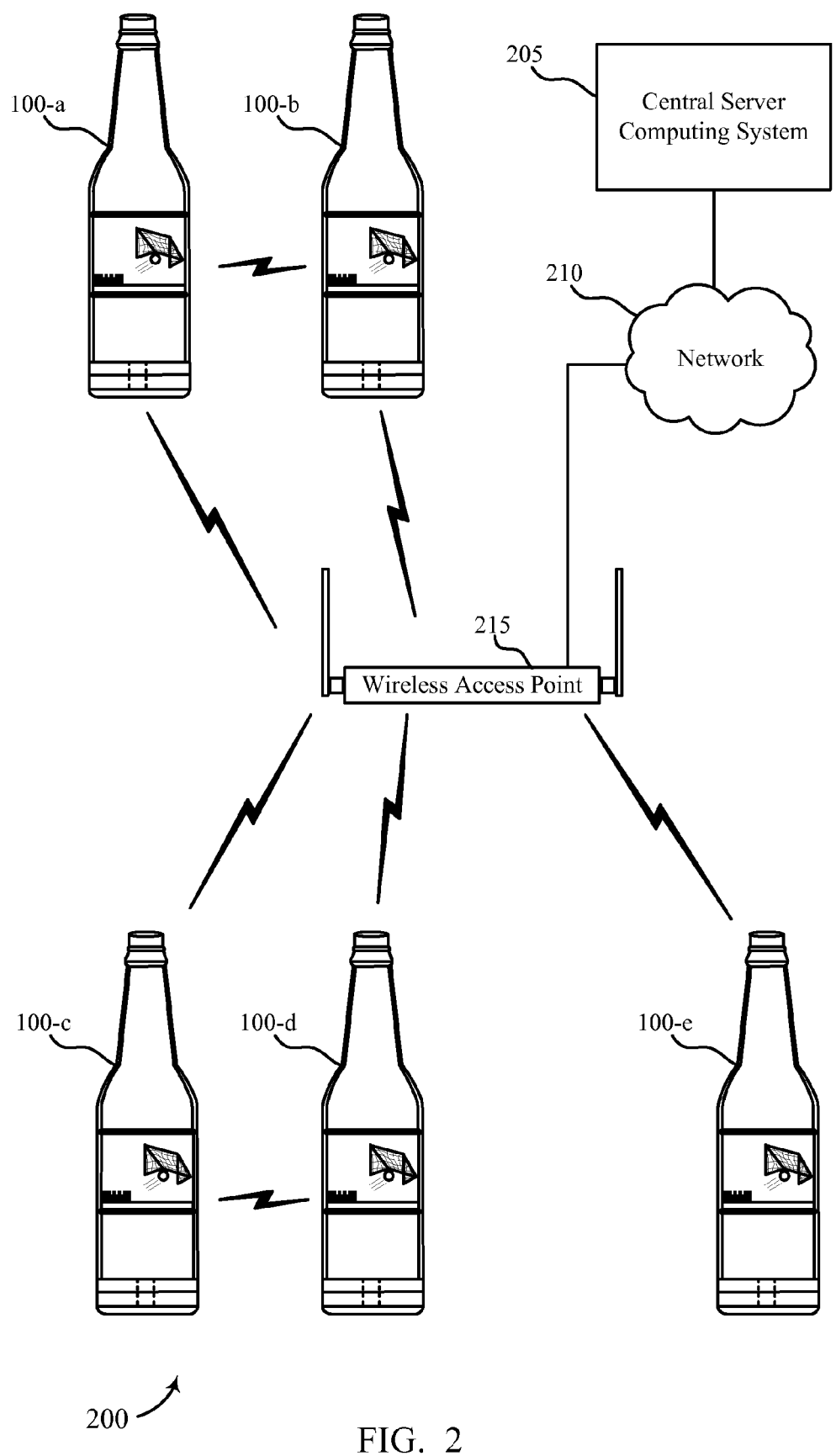
FIG. 2 is a diagram illustrating an example system for communicating with intelligent beverage containers according to various embodiments of the invention.

FIG. 2 is a block diagram of an example system 200 in which a number of intelligent beverage containers 100 may communicate with a central server computer system 205 over network 210 and one or more wireless access points 215. The system 200 may be used to enable communication between beverage containers 100 and allow the central server computer system 205 to implement polling event activities among users of different beverage containers 100 based on communication with the beverage containers 100. In the illustrative example shown in FIG. 2, the system 200 may be used to allow the central server computer system 205 to change the information being displayed on the beverage containers 100 based on real-time activities occurring at an event (e.g., based on a team scoring a goal).

The beverage containers 100 may each have a WLAN transceiver that can establish a Wi-Fi connection to the wireless access point 215. The wireless access point 215 may enable the beverage containers 100 to communicate with each other and with the central server computer system 205 over the network 210. The central server computer system 205 may coordinate interactions and activities between the users of the beverage containers 100. To coordinate these interactions and activities, the central server computer system 205 may communicate with the individual beverage containers 100 to control the respective electronic displays 115 integrated into each beverage container 100 and display information related to the event.

In certain examples, the central server computer system 205 may receive input from the beverage containers 100, including location input, proximity to other beverage containers 100, gestures measured by gyroscopes, and the like. The central server computer system 205 may respond to such input based on one or more rules associated with a polling event for one or more of the beverage containers 100. Additionally or alternatively, the central server computer system 205 may respond to extrinsic input inferred or received from a source other than the beverage containers 100. Such a response may include displaying special messages on the electronic displays of one or more beverage containers 100, awarding refill or other incentives to users associated with specific beverage containers, or other relevant action.

In certain examples, the individual beverage containers 100 may communicate with each other without going through the wireless access point 215 or the network 210. For example, beverage containers 100-a and 100-b may communicate directly with each other over an ad-hoc WiFi connection, a Bluetooth connection, an NFC connection, or another type of wireless connection. In certain examples, the beverage containers 100 may be programmed to exchange data or implement polling event activities on an ad-hoc basis without connection to the network 210 or server computer system 205.

Figure 3:
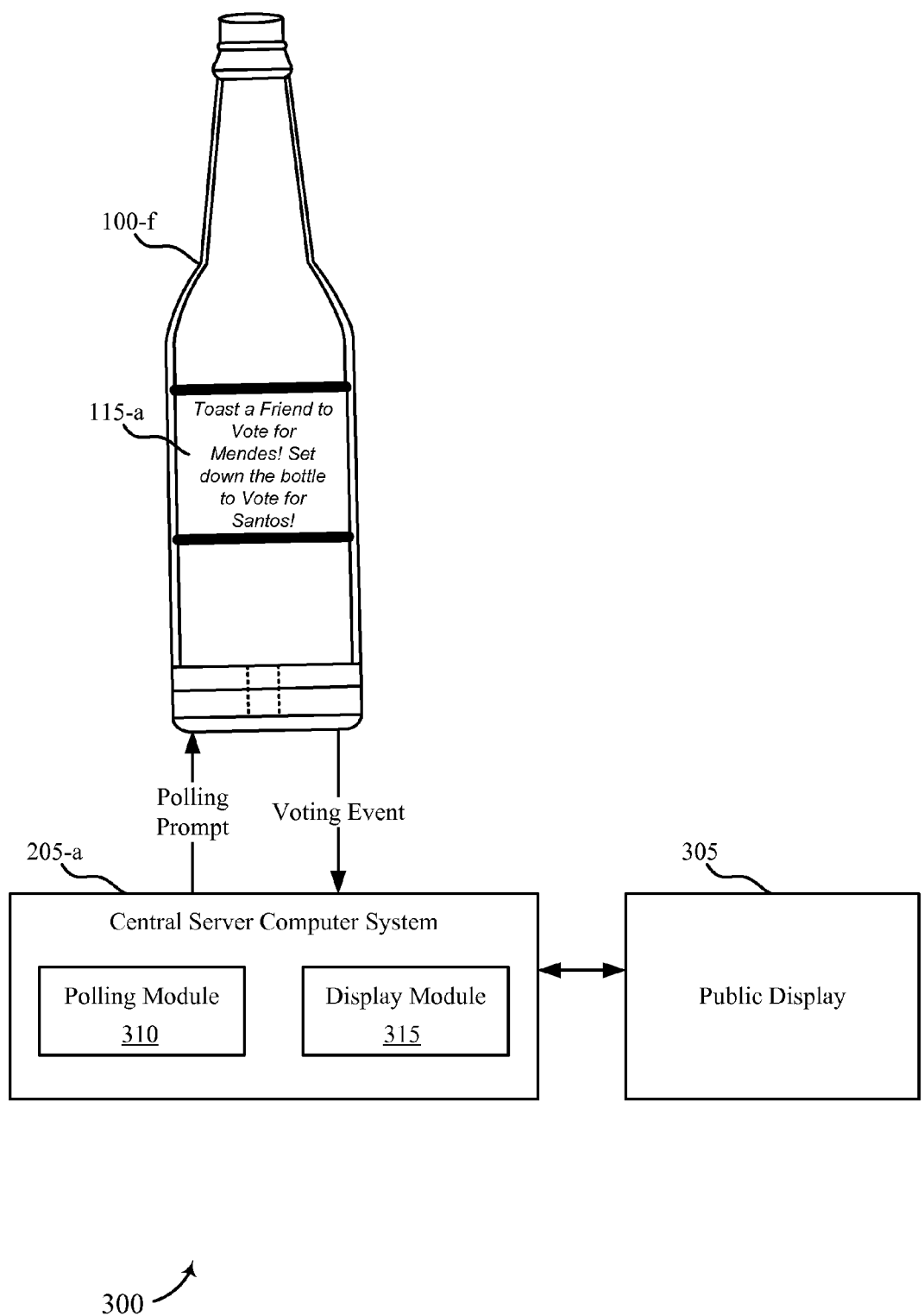
FIG. 3 is a diagram illustrating an example centrally coordinated gesture based polling system communicating with intelligent beverage containers according to various embodiments of the invention.

FIG. 3 is a diagram of an example system 300 for coordinating and implementing an example polling event using a central server computer system 205-a. The system 300 may include a central server computer system 205-a communicatively coupled with a number of intelligent beverage containers 100 (one beverage container 100-*f* being shown for clarity). The system 300 may be an example of the systems 200 described above with reference to FIG. 2. The beverage containers 100 of the present example may be examples of the beverage containers 100 described above with reference to previous Figures.

In the present example, the central server computer system 205-*a* may be configured to conduct a poll at an event or gathering. The central server computer system 205-*a* may determine one or more rules associated with the poll, communicate with participating beverage containers 100 to provide dynamic messages (e.g., text, images, video, or other content), receive inputs from the beverage containers 100, and determine the results of the poll based on the received inputs. For example, returning to the example of a sporting event, a number of beverage container 100 users may be dispersed throughout a stadium or other arena for the sporting event. As events progress in the sporting event, the central server computer system 205-*a* may receive extrinsic data related to the progression of the sporting event and dynamically generate instant replays, related photographs, text commentary or other messages related to the progression of the sporting event. Based on this extrinsic data or some other data, the central server computer system 205-*a* may implement a polling event related to activities occurring at the event (e.g., was that a good call by the referee, who is the MVP, etc.). The polling event information may be transmitted by the central server computer system 205-*a* to one or more participating beverage containers 100. The users can use the beverage containers 100 to input their selection which is communicated to and automatically tallied by the central server computer system 205-*a*.

To implement this functionality, the central server computer system 205-*a* may include a polling module 310 configured to determine a polling event, generate messages related to the polling event, receive selections from the beverage containers 100, and determine the results of the poll. In the present example, the polling module 310 may receive extrinsic data related to which player should be the MVP of the game and determine to conduct a poll based on the two players with the greatest performance statistics. The polling module 310 may determine that a poll related to a MVP determination between two players may require one of two inputs from poll participants. Accordingly, the polling module 310 may assign a first input to a first player and a second input to a second player. The polling module 310 may generate a polling prompt message and communicate the polling prompt to the participating beverage containers 100.

The polling prompt received by the beverage containers 100 will change the electronic display 115 to indicate that a poll is being conducted and instruct the user how to participate in the poll (e.g., which input is associated with a particular selection). In the example of FIG. 3, the polling prompt message instructs the user to toast a friend to vote for a first player or to set the bottle down to vote for a second player. The user may participate in the poll (e.g., vote) by following the displayed polling prompt instructions. One or more motion sensors integrated into the beverage containers 100 (e.g., accelerometers, gyroscopes, etc.) can detect the movement of the beverage container 100 to determine the user's input. The detected input (e.g., voting event) can be communicated to the central server computer system 205-*a* such that the user's selection can be determined and added to the tally.

The polling module 310 may receive the inputs from the participating beverage containers 100 and determine the poll winner. To communicate the poll results, the central server computer system 205-*a* may also comprise a display module 315. The display module 315 may receive the poll results from the polling module 310 and communicate or otherwise cause a public display 305 to display the poll results. The public display 305 may be one or more jumbotrons, one or more televisions positioned around an event location, and the like.

Figure 4:
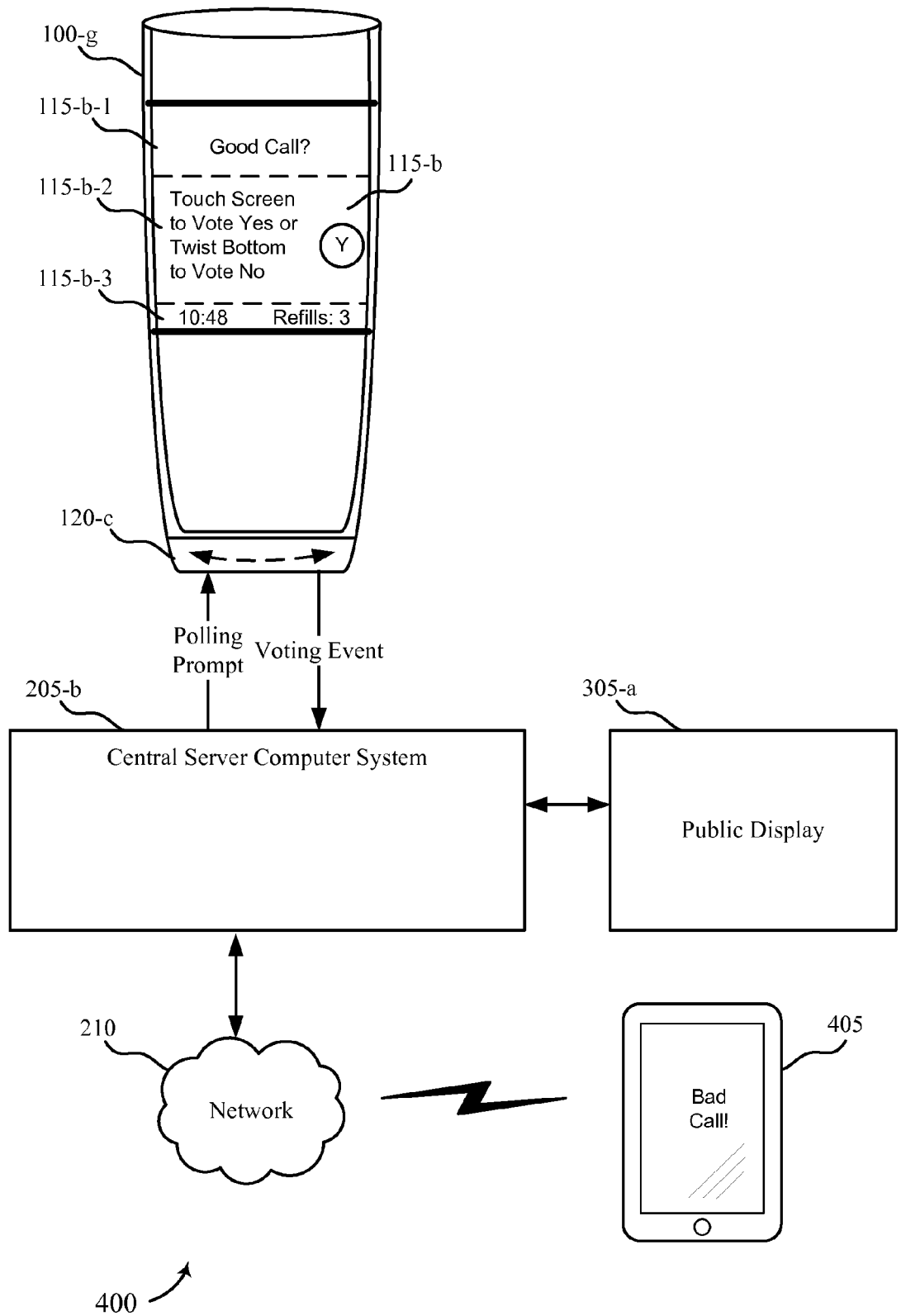
FIG. 4 is a diagram illustrating another example centrally coordinated gesture based polling system communicating with intelligent beverage containers according to various embodiments of the invention.

FIG. 4 is a diagram of another example system 500 for coordinating and implementing an example polling event using a central server computer system 205-*b*. The system 400 may include a central server computer system 205-*b* communicatively coupled with a number of intelligent beverage containers 100. The system 400 may be an example of the systems 200 and/or 300 described above with reference to FIGS. 2-3. The beverage containers 100 of the present example may be examples of the beverage containers 100 described above with reference to previous Figures.

In the present example, the central server computer system 205-*b* may be configured to conduct a poll at an event or gathering. The central server computer system 205-*b* may determine one or more rules associated with the poll, communicate with participating beverage containers 100 to provide dynamic messages (e.g., text, images, video, or other content), receive inputs from the beverage containers 100, and determine the results of the poll based on the received inputs. For example, the central server computer system 205-*b* may implement a polling event related to activities occurring at the event (e.g., was that a good call by the referee, who is the MVP, etc.). The polling event information may be transmitted by the central server computer system 205-*b* to one or more participating beverage containers 100. The users can use the beverage containers 100 to input their selection which is communicated to and automatically tallied by the central server computer system 205-*b*.

Moreover, FIG. 4 illustrates additional features with respect to the beverage containers 100 and also with respect to how the poll results can be displayed or otherwise communicated to the poll participants. Regarding the beverage container 100 (identified in FIG. 4 as 100-*g*), the electronic display 115-*b* may be divided into one or more virtual displays 115-*b*-1, 115-*b*-2, and 115-*b*-3. The central server computer system 250-*b* may transmit one or more messages to the beverage containers 100 during a polling event wherein different virtual displays show different information. In the example shown in FIG. 4, a first virtual display 115-*b*-1 may, based on information in the polling prompt message, display the purpose or question to be resolved by the poll. Returning the sporting event example, the virtual display 115-*b*-1 can indicate that a poll is being conducted to determine whether the users consider a controversial referee call to be a good call. A second virtual display 115-*b*-2 may, based on information in the polling prompt message, inform the user how to participate in the poll. In the example shown in FIG. 4, the electronic display 115 is a touch screen such that the user is informed to touch a particular portion of the display to vote yes. Alternatively, the user is informed to provide a different input to vote no. In this example, the electronics module 120 is configured to permit the user to twist at least a portion of the electronics module 120 to vote no. The third virtual display 115-*b*-3 may show information unrelated to the poll, e.g., static information such as the score, time, number of refills the user has available, etc. The beverage container 100 may receive the user's input depending on whether the user touches the screen or twists the bottom portion of the beverage container 100. The beverage container 100 may communicate the user's selection to the central server computer system 205-*b* in a voting event message.

The central server computer system 205-*b* may receive the selections from each participating beverage container 100 and, based on the selections, determine the results of the poll. As previously discussed, the central server computer system 205-*b* may show the poll results on one or more of a public display 305-*a*. The public display 305-*a* may be one or more jumbotrons, one or more televisions positioned around an event location, and the like.

Moreover, as previously discussed, each of the beverage containers 100 may be associated with a user account. The user account may store information related to the user of the beverage container, e.g., name, address, mobile phone number, etc. The central server computer system 205-*b* may, based on information stored in the user accounts, communicate the poll results to the user via a network 210 via one or more of a text message, a multimedia message, an e-mail, a video file, an audio recording, and the like. In the example shown in FIG. 4, the central server computer system 205-*b* may communicate the poll results to a mobile communications device 405 of the user via a text message.

Figure 5:
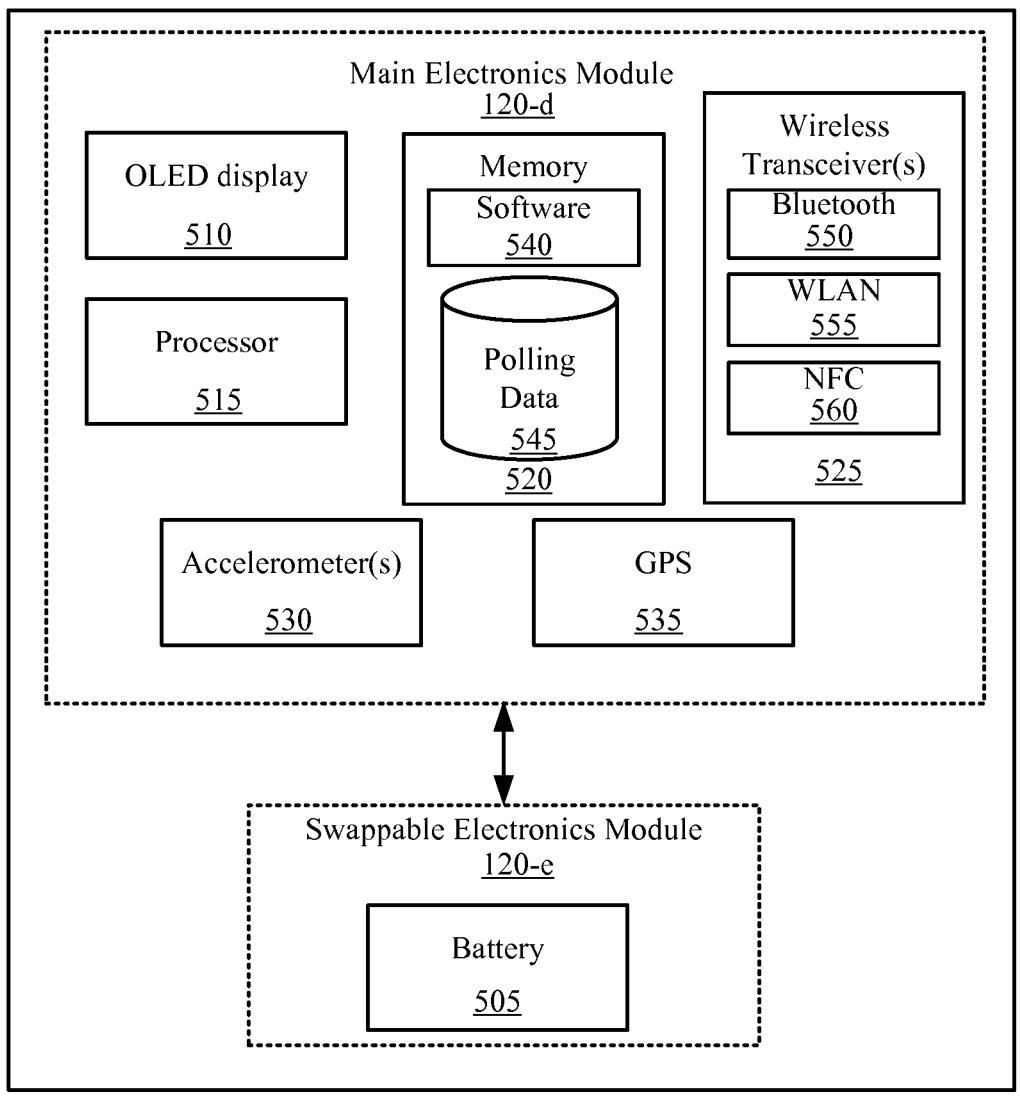
FIG. 5 is a block diagram of an example beverage container configured according to various embodiments of the invention.

FIG. 5 is a block diagram of an example intelligent beverage container 100-*h*. The beverage container 100-*h* of the present example may be an example of the beverage containers 100 described above with respect to the previous Figures. The beverage container 100-*h* of the present example may include a main electronics module 120-*d* and a swappable electronics module 120-*e* in communication with each other. The main electronics module 120-*d* may include circuitry implementing a number of electronic components that are permanently associated with the beverage container 100-*h*. The swappable electronics module 120-*e* may include circuitry implementing a number of electronic components that can be interchangeably associated with different beverage containers 100. While the example of FIG. 5 shows only a battery 505 in the swappable electronics module 120-*e* and all other electronic components in the main electronics module 120-*d*, each of the electronic components shown in FIG. 5 may be implemented by either the main electronics module 120-*d* or the swappable electronics module 120-*e*. In still other examples, only a main electronics module 120-*d* or a swappable electronics module 120-*e* may be used to implement all of the electronic components for a beverage container 100-*h*.

In the present example, the main electronics module 120-*d* may include an OLED display 510 integrated into the beverage container 100-*h* as described above with respect to FIG. 1. Alternatively, the beverage container 100-*h* may include another type of flexible or curved electronic display. The main electronics module 120-*d* may further include a processor 515 and a memory 520. The processor 515 may execute software 540 stored in the memory 520 to control the OLED display 510, track data about the use of the beverage container, implement polling activities, and the like. The memory 520 may store polling data 545 containing information and other data for communicating with a central server computer system or other beverage containers 100 to implement polling activities among a number of beverage containers 100. The wireless transceiver(s) 525 may include one or more of a Bluetooth transceiver 550, a WLAN transceiver 555, an NFC transceiver 560, or other types of transceivers that may suit a particular application of the principles of this disclosure.

The main electronics module 120-*d* may further include one or more accelerometers 530 to detect movement of the bottle, a GPS module 535 to detect location, and/or other types of motion sensors or input devices. The processor 515 may receive input from these devices and take action based on the input. Additionally or alternatively, the processor 515 may report the input to a network server and receive instructions from the network server based on the input.

Figure 6:
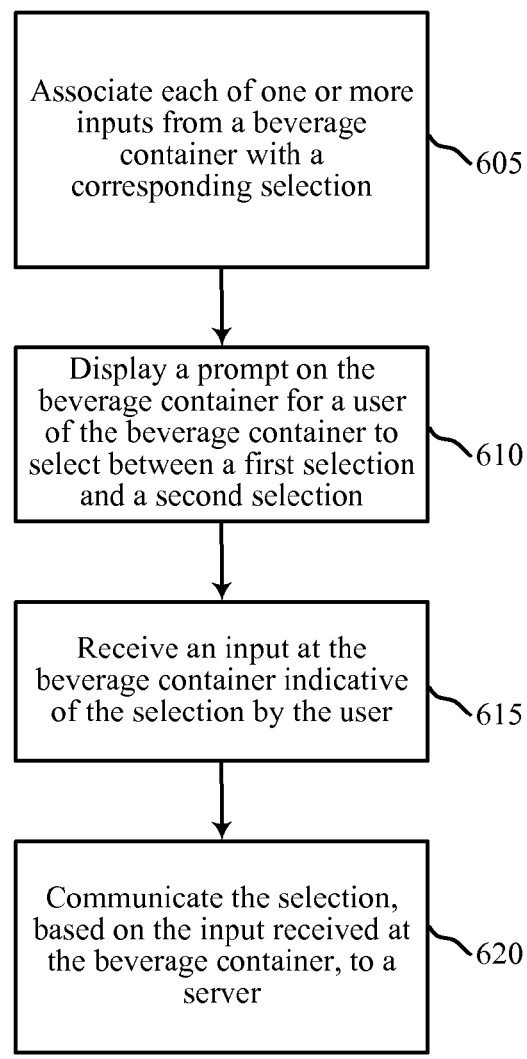
FIG. 6 is a flowchart diagram of an example method for gesture based polling according to various embodiments of the invention.

FIG. 6 is a flowchart of a method 600 for conducting a poll in accordance with aspects of the present disclosure. Aspects of the method 600 may be performed by one or more of the systems 200, 300, and/or 400 of FIGS. 2-4. In one implementation, the central server computer system may execute one or more sets of codes or computer executable instructions to control the functional elements of the systems 200, 300, and/or 400 to perform aspects of the functions described below. In another implementation, the electronics module 120 of the beverage containers 100 may execute one or more sets of codes or computer executable instructions to control the functional elements of the beverage container 100 to perform aspects of the functions described below.

At block 605, each of one or more inputs from a beverage container 100 may be associated with a corresponding selection. The inputs may be one or more of a gesture or movement of the beverage container 100, activation of one or more buttons or switches integrated into the beverage container 100, rotation of at least a portion of the beverage container 100, and the like. One or more sensors or modules integrated into the beverage containers 100 may determine which input the user provides based on the detection of the associated gesture or activation. At block 610, a prompt may be displayed on the beverage container 100 for a user of the beverage container to select between a first selection and a second selection. The prompt may inform the user which input is associated with a particular selection.

At block 615, an input may be received at the beverage container indicative of the selection by the user. For example, the user may provide an input by touching a portion of the electronic display 115, by rotating at least a portion of the beverage container 100, etc. At block 620, the selection, based on the input received at the beverage container 100, may be communicated to a server (e.g., a central server computer system). The central server computer system may receive the selections from the participating beverage containers 100 and determine the results of the poll.

Figure 7:
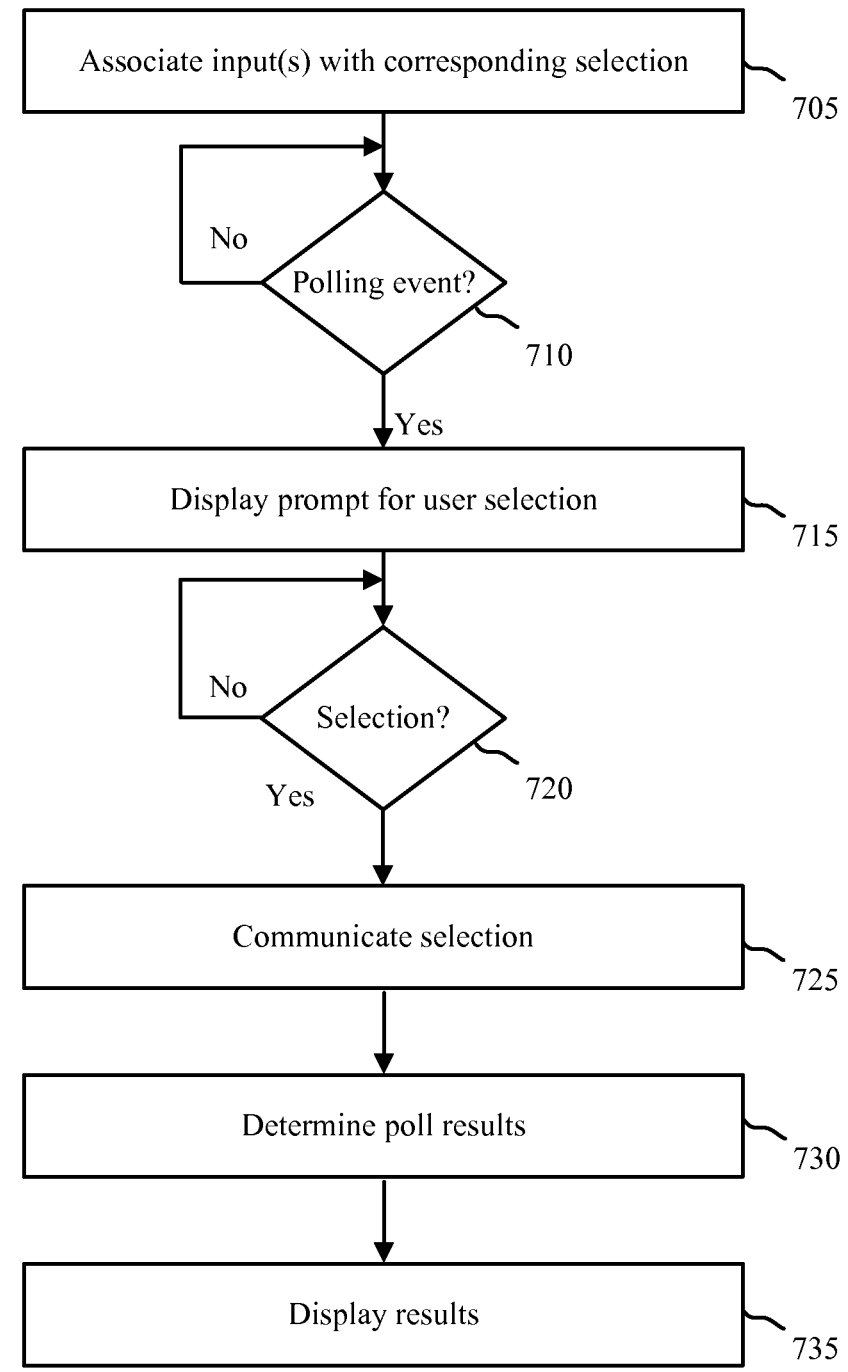
FIG. 7 is a flowchart diagram of an example method for gesture based polling according to various embodiments of the invention.

FIG. 7 is a flowchart of a method 700 for conducting a poll in accordance with aspects of the present disclosure. Aspects of the method 700 may be performed by one or more of the systems 200, 300, and/or 400 of FIGS. 2-4. In one implementation, the central server computer system may execute one or more sets of codes or computer executable instructions to control the functional elements of the systems 200, 300, and/or 400 to perform certain aspects of the functions described below. In another implementation, the electronics module 120 of the beverage containers 100 may execute one or more sets of codes or computer executable instructions to control the functional elements of the beverage container 100 to perform certain aspects of the functions described below.

At block 705, one or more input(s) may be associated with a selection. The inputs may be from an intelligent beverage container 100. At block 710, it is determined whether there is a polling event. As discussed in the previous examples, the polling event may be held randomly or based on an activity occurring during an event. The polling event may be determined by a central server computer system. At block 715, a prompt may be displayed for user selection. The central server computer system may communicate a polling prompt to the beverage containers 100 causing the electronic displays 115 to change. The polling prompt may inform the user the nature of the polling event being conducted as well as which inputs are associated with a related selection. At block 720, it may be determined whether a selection has been made. The selection may be made by a user of the beverage container inputting the desired input. As previously discussed, the user may provide an input to the beverage container 100 via one or more of a touchscreen integrated into the beverage container, a gesture made with the beverage container and detected by one or more motion or location sensors integrated into the beverage container, and/or an activation of a switch, button, and the like integrated into the beverage container.

At block 725, the selection may be communicated to the central server computer system. The selection may be communicated by a wireless connection between the beverage containers 100 and the central server computer system. At block 730, the poll results may be determined. The central server computer system may determine the poll results based on the selections received from the participating beverage containers 100. At block 735, the poll results may be displayed. The poll results may be displayed on one or more public displays, on one or more of the beverage containers, and/or be communicated to a mobile communications device of the users of the beverage containers 100.

Figure 8:
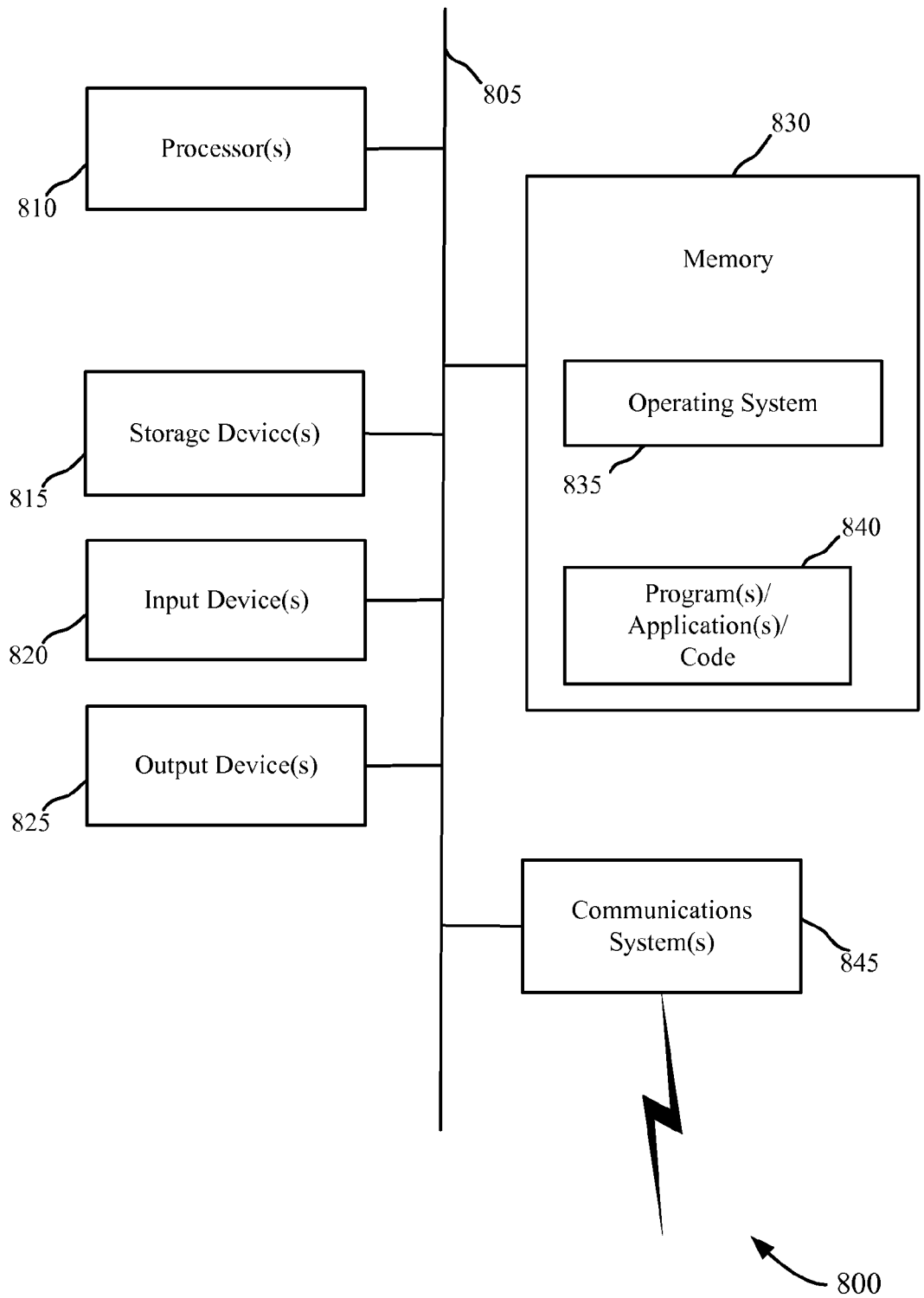
FIG. 8 is a schematic diagram that illustrates a representative device structure that may be used in various embodiments of the present invention.

A device structure 800 that may be used for a beverage container 100, a central server computer system 205, or other computing devices described herein, is illustrated with the schematic diagram of FIG. 8. This drawing broadly illustrates how individual system elements of each of the aforementioned devices may be implemented, whether in a separated or more integrated manner. The exemplary structure is shown comprised of hardware elements that are electrically coupled via bus 805, including processor(s) 810 (which may further comprise a DSP or special-purpose processor), storage device(s) 815, input device(s) 820, and output device(s) 825. The storage device(s) 815 may be a machine-readable storage media reader connected to any machine-readable storage medium, the combination comprehensively representing remote, local, fixed, or removable storage devices or storage media for temporarily or more permanently containing computer-readable information. The communications systems interface 845 may interface to a wired, wireless, or other type of interfacing connection that permits data to be exchanged with other devices. The communications system(s) interface 845 may permit data to be exchanged with a network.

The device structure 800 may also include additional software elements, shown as being currently located within working memory 830, including an operating system 835 and other code 840, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for conducting a polling event comprising:
receiving from a server, at a beverage container, extrinsic data related to an event external to the beverage container and the server;
associating each of a plurality of gesture movements of the beverage container with a corresponding response to a contemporaneous poll based on the extrinsic data;
displaying a prompt on the beverage container for a user of the beverage container to select one of the responses to the contemporaneous poll;

detecting one of the gesture movements of the beverage container indicative of a response selected by the user; and communicating the selected response to the server based on the detected gesture movement.

2. The method of claim 1, wherein detecting one of the gesture movements comprises detecting whether the beverage container has been moved according to the one of the gesture movements.

3. The method of claim 1, further comprising:
displaying a request for the response on the beverage container, wherein the displayed request includes information indicative of which gesture movement is associated with each of the selections.

4. The method of claim 1, wherein the plurality of gesture movements comprises one or more of a tilting of the beverage container in a predetermined direction, a raising of the beverage container, a lowering of the beverage container, a striking of the beverage container against an object for one or more times, a rotating of the beverage container, a rotating of at least a portion of the beverage container, or a depressing of a lever of the beverage container.

5. The method of claim 1, further comprising:
displaying results of the contemporaneous poll based on communicated selections from a plurality of beverage containers.

6. The method of claim 5, wherein the results are displayed on the beverage container.

7. The method of claim 1, further comprising:
associating a user account with the beverage container; and
associating the selected response with the user account based on the detected gesture movement of the beverage container.

8. The method of claim 7, further comprising:
retrieving a contact information from the user account; and
displaying, on a mobile communications device associated with the contact information, results of the contemporaneous poll based on communicated responses from a plurality of beverage containers.

9. The method of claim 1, wherein detecting one of the gesture movements of the beverage container comprises monitoring a signal from one or more of an accelerometer, a gyroscope, or a global positioning system incorporated into the beverage container.

10. The method of claim 1, wherein communicating the selected response comprises:
transmitting a wireless signal from a wireless communications module in the beverage container.

11. An apparatus for conducting a polling event comprising:
a processor;
a memory in electronic communication with the processor;
the memory storing instructions executable by the processor to:
receive from a server, at a beverage container, extrinsic data related to an event external to the beverage container and the server;
associate each of a plurality of gesture movements of the beverage container with a corresponding response to a contemporaneous poll based on the extrinsic data;
display a prompt on the beverage container for a user of the beverage container to select one of the responses to the contemporaneous poll;
detect one of the gesture movements of the beverage container indicative of a response selected by the user; and
communicate the selected response to a server based on the detected gesture movement.

12. The apparatus of claim 11, wherein detecting one of the gesture movements comprises detecting whether the beverage container has been moved according to the one of the gesture movements.

13. The apparatus of claim 11, wherein the instructions are further executable by the processor to:
display a request for the response on the beverage container, wherein the displayed request includes information indicative of which gesture movement is associated with each of the selections.

14. A central server computer system configured for conducting a polling event comprising:
a polling module configured to transmit to a beverage container extrinsic data related to an event external to the beverage container and the central server computer system, associate each of one or more inputs from the beverage container with a corresponding response to a contemporaneous poll based on the extrinsic data, communicate a polling prompt message to the beverage container to cause the beverage container to display a prompt for a user to select one of the responses to the contemporaneous poll, receive a response selected by the user from the beverage container based on a gesture movement of the beverage container, and determine results of the polling event based at least in part on the response received from the beverage container; and
a display module configured to display the results of the polling event.

15. The central server computer system of claim 14, wherein the results of the polling event are displayed on one or more public displays.

16. The central server computer system of claim 14, wherein the results of the polling event are communicated to a wireless communications device associated with the user of the beverage container to be displayed on the wireless communications device.

17. The central server computer system of claim 14, wherein the beverage container comprises one or more of a bottle, a cup, a mug, a glass, a can, a pitcher, a tumbler, or a chalice.

* * * * *